United States Patent
Matsumori et al.

(10) Patent No.: US 12,441,298 B2
(45) Date of Patent: Oct. 14, 2025

(54) HYBRID ELECTRIC VEHICLE

(71) Applicant: TOYOTA JIDOSHA KABUSHIKI KAISHA, Toyota (JP)

(72) Inventors: Hiroshi Matsumori, Mishima (JP); Yoshihiro Sakayanagi, Mishima (JP); Manabu Handa, Susono (JP); Midori Sugiyama, Susono (JP); Hirotaka Saito, Sunto-gun (JP); Yuki Takahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 17/818,474

(22) Filed: Aug. 9, 2022

(65) Prior Publication Data

US 2023/0083650 A1 Mar. 16, 2023

(30) Foreign Application Priority Data

Sep. 13, 2021 (JP) ................ 2021-148635

(51) Int. Cl.
*B60W 20/18* (2016.01)
*B60W 10/06* (2006.01)
(Continued)

(52) U.S. Cl.
CPC ............ *B60W 20/18* (2016.01); *B60W 10/06* (2013.01); *B60W 10/08* (2013.01); *B60W 20/12* (2016.01);
(Continued)

(58) Field of Classification Search
CPC ...... B60W 10/06; B60W 10/08; B60W 20/12; B60W 20/15; B60W 20/18; B60W 40/09;
(Continued)

(56) References Cited

U.S. PATENT DOCUMENTS

| 2013/0151056 A1* | 6/2013 | Nakano | B60K 6/46 903/903 |
| 2013/0211641 A1* | 8/2013 | Fujii | B60K 6/48 180/65.265 |

(Continued)

FOREIGN PATENT DOCUMENTS

| EP | 3360743 B1 * | 7/2020 | ............ B60W 10/06 |
| JP | 2008-149972 A | 7/2008 | |

(Continued)

OTHER PUBLICATIONS

Translation of JP2013184678 (Year: 2013).*
Translation of EP 3360743 (Year: 2020).*

*Primary Examiner* — Christian Chace
*Assistant Examiner* — Nicholas Stryker
(74) *Attorney, Agent, or Firm* — Finnegan, Henderson, Farabow, Garrett and Dunner, LLP

(57) ABSTRACT

A communication device acquires schedule information in which a schedule of a user who uses a hybrid electric vehicle is recorded. The schedule information includes a traveling schedule for causing the hybrid electric vehicle to travel in a predetermined period. The predetermined period is a period from when fuel of an engine is refueled to a predetermined deterioration time. When a traveling distance in a long-distance traveling schedule is a first distance, an ECU increases a usage ratio of the engine in the predetermined period than when the traveling distance is a second distance that is longer than the first distance. The long-distance traveling schedule is a schedule included in the traveling schedule and in which the hybrid electric vehicle travels for a predetermined distance or longer.

8 Claims, 13 Drawing Sheets

(51) Int. Cl.
*B60W 10/08* (2006.01)
*B60W 20/12* (2016.01)
*B60W 40/09* (2012.01)

(52) U.S. Cl.
CPC ....... *B60W 40/09* (2013.01); *B60W 2510/244* (2013.01); *B60W 2530/211* (2020.02)

(58) Field of Classification Search
CPC ..... B60W 2510/244; B60W 2530/211; B60W 2556/10; G05D 1/0061; G05D 1/0088; G05D 1/021; G05D 1/0214; G05D 1/0221; G05D 1/0223; Y02T 10/62
See application file for complete search history.

(56) References Cited

U.S. PATENT DOCUMENTS

| | | | |
|---|---|---|---|
| 2014/0114511 A1* | 4/2014 | Sangameswaran ... | B60W 10/06 180/65.265 |
| 2015/0069963 A1* | 3/2015 | Ichikawa ................ | B60L 50/40 320/108 |
| 2015/0345962 A1* | 12/2015 | Graham ............... | G06Q 10/047 701/423 |
| 2018/0111602 A1* | 4/2018 | Takagi .................. | B60W 10/26 |
| 2019/0232944 A1* | 8/2019 | Kai ....................... | B60W 10/06 |
| 2020/0393259 A1* | 12/2020 | Gantt, Jr. ................ | B60L 53/65 |

FOREIGN PATENT DOCUMENTS

| | | | | |
|---|---|---|---|---|
| JP | 2012-166777 A | | 9/2012 | |
| JP | 2013184678 A | * | 9/2013 | |
| JP | 2020044903 | * | 3/2020 | ............. Y02T 10/62 |

* cited by examiner

FIG. 6

| CALENDAR | | | < OCTOBER 2021 > | | | |
|---|---|---|---|---|---|---|
| SUNDAY | MONDAY | TUESDAY | WEDNESDAY | THURSDAY | FRIDAY | SATURDAY |
| 9/26 | 27 | 28 ... | 29 | 30 B CITY IN A PREFECTURE | 10/1 | 2 |
| 3 | 4 BUSINESS TRIP TO COMPANY C | 5 | 6 | 7 ... | 8 | 9 TRIP TO HOT SPRING D |
| 10 | 11 | 12 | 13 THOROUGH CLEANING | 14 | 15 LESSON IN CLASS- ROOM E | 16 |
| 17 G CITY IN F PREFEC- TURE | 18 | 19 ... | 20 | 21 ... | 22 | 23 |
| 24 | 25 | 26 HOSPITAL H | 27 | 28 | 29 | 30 AMUSEMENT PARK I |

FIG. 14

| PRIVATE VEHICLE USAGE SETTING | | |
|---|---|---|
| DATE | DESTINATION | USE OF PRIVATE VEHICLE |
| SEPTEMBER 30TH, 2021 | B CITY IN A PREFECTURE | ✓ |
| OCTOBER 4TH, 2021 | BUSINESS TRIP TO COMPANY C | |
| OCTOBER 9TH, 2021 | TRIP TO HOT SPRING D | ✓ |
| OCTOBER 15TH, 2021 | LESSON IN CLASSROOM E | |
| OCTOBER 17TH, 2021 | G CITY IN F PREFECTURE | ✓ |
| OCTOBER 26TH, 2021 | HOSPITAL H | |
| OCTOBER 30TH, 2021 | AMUSEMENT PARK I | ✓ |

SEND

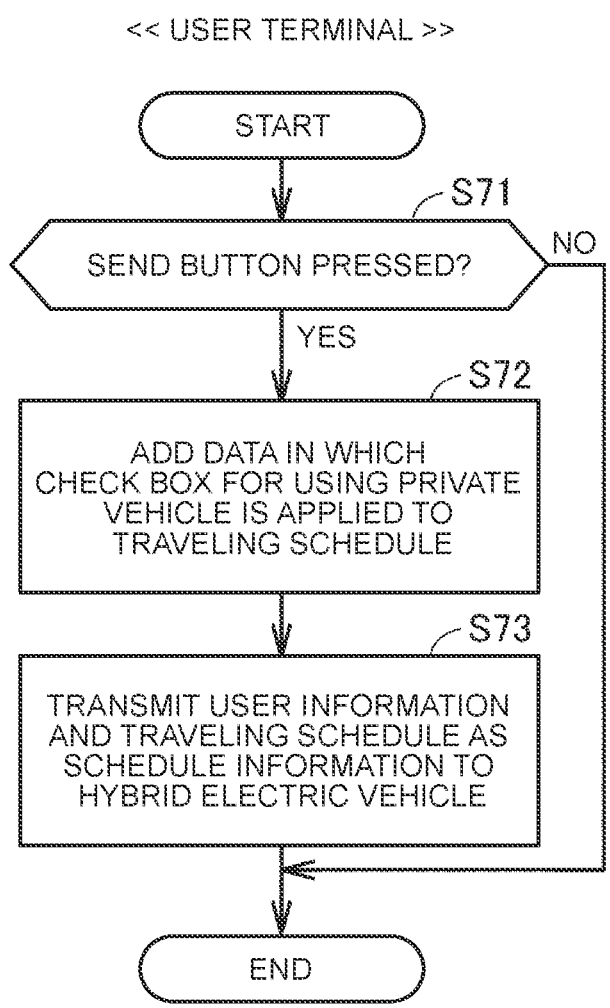

HYBRID ELECTRIC VEHICLE

CROSS-REFERENCE TO RELATED APPLICATION

This application claims priority to Japanese Patent Application No. 2021-148635 filed on Sep. 13, 2021, incorporated herein by reference in its entirety.

BACKGROUND

1. Technical Field

The present disclosure relates to a hybrid electric vehicle.

2. Description of Related Art

Japanese Unexamined Patent Application Publication No. 2012-166777 (JP 2012-166777 A) discloses a hybrid electric vehicle that promotes fuel consumption when fuel deterioration is predicted. In the hybrid electric vehicle of JP 2012-166777 A, when the estimated value of the number of days required for the fuel to reach zero (or for the fuel to be refueled next time) is later than the estimated value of the number of days required for the fuel to deteriorate, the traveling mode is switched to the fuel promotion mode in which the hybrid electric vehicle travels by increasing the usage ratio of the engine, among the drive motor and the engine.

SUMMARY

However, the technique disclosed in JP 2012-166777 A estimates the number of days required for the fuel to reach zero based on the past traveling history, and does not take into consideration the actual traveling schedule. For this reason, there is a risk that the usage ratio of the engine will be higher than necessary due to the discrepancy between the estimated traveling distance and the actual traveling distance. In such a case, it is impossible to satisfy the user's desire to reduce the environmental load by increasing the traveling ratio of electric power by using the motor as much as possible.

The present disclosure has been made to solve such a problem, and an object thereof is to provide a hybrid electric vehicle capable of increasing a traveling ratio by electric power while suppressing deterioration of fuel.

A hybrid electric vehicle according to an aspect of the present disclosure includes an engine, a motor, a power storage device, a control device, and an acquisition unit. The motor generates driving force. The power storage device supplies electric power to the motor. The control device controls the motor and the engine. The acquisition unit acquires schedule information in which a schedule of a user who uses the hybrid electric vehicle is recorded. The schedule information includes a traveling schedule for causing the hybrid electric vehicle to travel in a predetermined period. The predetermined period is a period from when fuel of the engine is refueled to a predetermined deterioration time. When a traveling distance in a long-distance traveling schedule is a first distance, the control device increases a usage ratio of the engine in the predetermined period than when the traveling distance is a second distance that is longer than the first distance. The long-distance traveling schedule is a schedule included in the traveling schedule and in which the hybrid electric vehicle travels for a predetermined distance or longer.

In the above configuration, as the traveling distance in the long-distance traveling schedule included in the schedule information in which the user's schedule is recorded decreases, the usage ratio of the engine increases in the period from when fuel is refueled to the predetermined deterioration time. In this way, since the usage ratio of the engine is adjusted in consideration of the actual long-distance traveling schedule in which fuel consumption occurs, it is possible to reduce unnecessary use of the engine. As a result, it is possible to increase the traveling ratio by electric power while suppressing the deterioration of fuel.

In an embodiment, the control device controls the hybrid electric vehicle to either a charge depleting (CD) mode or a charge sustaining (CS) mode. The control device performs promotion control in which a ratio of controlling to the CS mode is increased in the predetermined period when the traveling distance in the long-distance traveling schedule is the first distance as compared with when the traveling distance is the second distance.

In the above configuration, as the traveling distance in the long-distance traveling schedule included in the schedule information in which the user's schedule is recorded decreases, the promotion control is performed in which the ratio of controlling to the CS mode increases in the period from when fuel is refueled to the predetermined deterioration time. Since the ratio of controlling to the CS mode is adjusted in consideration of the actual long-distance traveling schedule in which fuel consumption occurs, it is possible to reduce unnecessary use of the engine (reduce controlling to the CS mode). As a result, it is possible to increase the traveling ratio by electric power while suppressing the deterioration of fuel.

In an embodiment, when the schedule information includes information about a location, the control device acquires the traveling distance based on the information about the location. According to the above configuration, the traveling distance for controlling the usage ratio of the engine can be automatically obtained without the user setting the traveling distance, so that the burden on the user can be reduced.

In an embodiment, the control device determines whether a schedule corresponds to the traveling schedule based on a keyword included in the schedule information. According to the above configuration, whether the schedule is the traveling schedule can be automatically determined based on the keyword without the need for the user to set whether the schedule is the traveling schedule, so that the burden on the user can be reduced.

In an embodiment, when the schedule information includes information about a location, the control device acquires the traveling distance based on the information about the location and determines whether a schedule corresponds to the traveling schedule based on the traveling distance. According to the above configuration, whether the schedule is the traveling schedule can be automatically determined based on the user's behavior pattern (traveling distance) without the need for the user to set whether the schedule is the traveling schedule, so that the burden on the user can be reduced.

In an embodiment, the control device switches from the CD mode to the CS mode when a state of charge (SOC) of the power storage device drops to a predetermined threshold value. The control device determines whether a remaining amount of fuel becomes equal to or less than a predetermined amount indicating a decrease in the fuel by the deterioration time based on the traveling distance in the CS mode in the long-distance traveling schedule. The control device performs the promotion control in which the predetermined threshold value is increased in the predetermined period when the control device determines that the remaining amount does not become equal to or less than the predetermined amount. According to the above configuration, whether to perform the promotion control is determined based on the fuel consumption amount (estimated from the traveling distance in the CS mode) in the actual scheduled long-distance traveling schedule, so that unnecessary use of the engine can be further reduced.

In an embodiment, the predetermined threshold value includes a first threshold value, a second threshold value larger than the first threshold value, and a third threshold value larger than the second threshold value. The control device uses the first threshold value in the predetermined period when the promotion control is not performed. The control device uses the second threshold value in a first period in the predetermined period and uses the third threshold value in a second period later than the first period in the predetermined period when the promotion control is performed. According to the above configuration, since the fuel consumption amount is increased as the deterioration time approaches in the promotion control, the fuel consumption can be reduced as much as possible in a time far from the deterioration time with large uncertainties, and the fuel can be reliably consumed around the deterioration time.

In an embodiment, the predetermined threshold value includes a first threshold value, a second threshold value larger than the first threshold value, and a third threshold value larger than the second threshold value. The control device uses the first threshold value in the predetermined period when the promotion control is not performed. The control device uses the second threshold value when the remaining amount is a first amount and uses the third threshold value when the remaining amount is a second amount smaller than the first amount in a case where the promotion control is performed. According to the above configuration, since the fuel consumption amount is increased as the remaining amount decreases in the promotion control, the fuel consumption can be reduced as much as possible in the initial stage with large uncertainties, and the fuel can be reliably consumed when the remaining amount is low.

In an embodiment, the hybrid electric vehicle further includes a power receiving device that is configured to be able to receive electric power from power supply equipment outside a vehicle. The power storage device is configured to be rechargeable by the electric power received by the power receiving device. The control device restricts charging from the power supply equipment when the promotion control is performed. According to the above configuration, by restricting the charging from the outside during the execution of the promotion control, the SOC cannot be sufficiently increased, and as a result, the control ratio to the CS mode is increased. Accordingly, the fuel consumption can be further promoted during the execution of the promotion control.

In an embodiment, the power receiving device is a non-contact power receiving device able to receive electric power in a non-contact manner. In a case where the non-contact power receiving device receives electric power from the power supply equipment arranged on a traveling path while the hybrid electric vehicle is traveling, when the promotion control is being executed, the control device makes a charging amount per unit time less than when the promotion control is not being executed. The charging amount during traveling is the charging amount per unit time multiplied by the power receiving time from the power supply equipment. According to the above configuration, by reducing the charging amount per unit time, the charging amount during traveling is reduced, so that the control ratio to the CS mode is increased. Accordingly, the fuel consumption can be further promoted during the execution of the promotion control.

According to the present disclosure, it is possible to increase the traveling ratio by electric power while suppressing the deterioration of fuel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram illustrating an example of schedule information displayed on a user terminal;

FIG. 14 is a diagram illustrating an example of a private vehicle usage setting screen displayed on a user terminal according to a third embodiment; and FIG. 15 is a flowchart showing a processing procedure of processes executed by the user terminal according to the third embodiment.

DETAILED DESCRIPTION OF EMBODIMENTS

Figure 1:
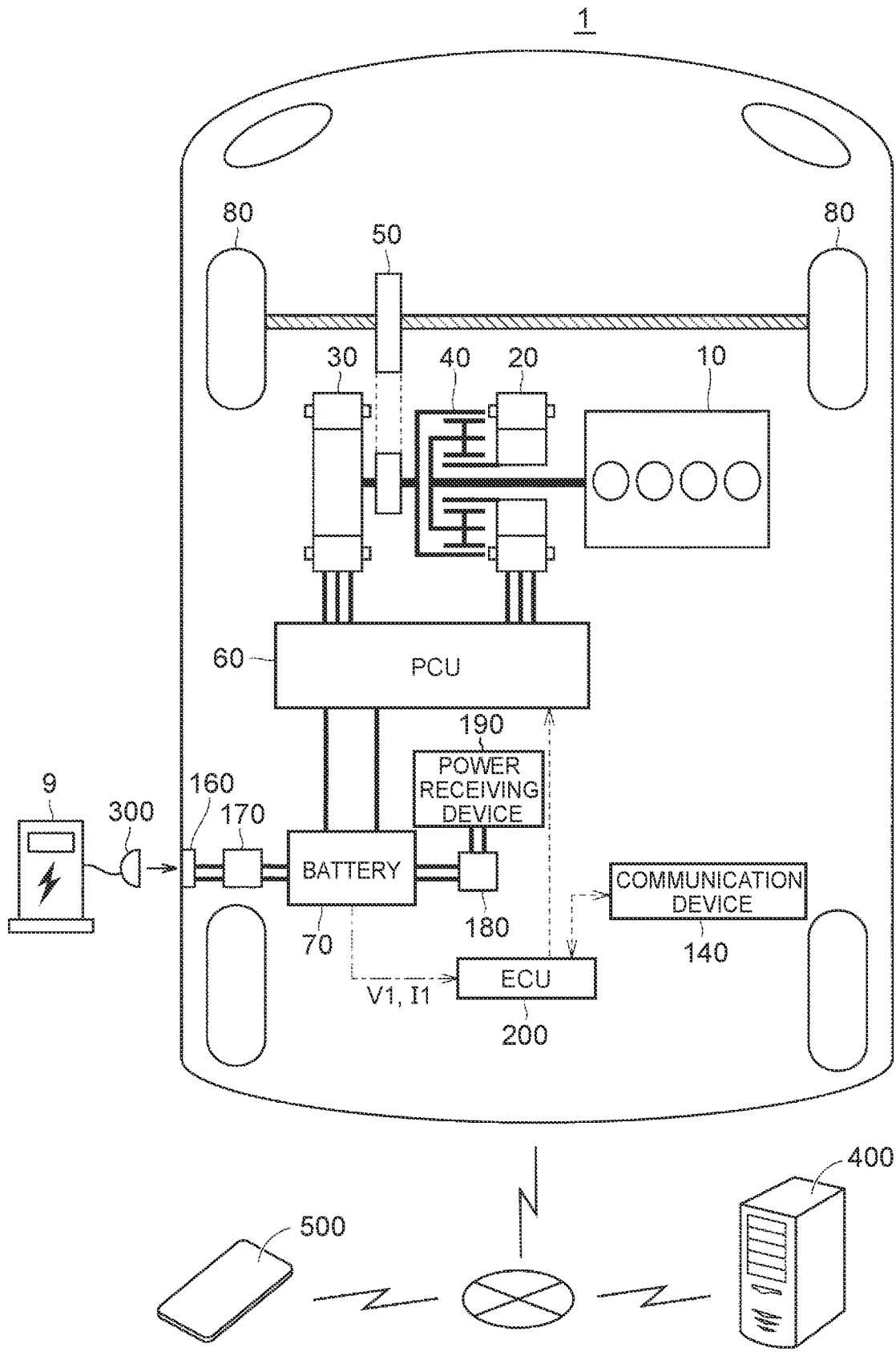
FIG. 1 is an overall block diagram of a hybrid electric vehicle according to a first embodiment.

Hereinafter, an embodiment of the present disclosure will be described in detail with reference to the drawings. In the drawings, the same or corresponding portions are denoted by the same reference signs and the description thereof will not be repeated.

First Embodiment

Configuration of Hybrid Electric Vehicle

FIG. 1 is an overall block diagram of a hybrid electric vehicle 1 according to a first embodiment. The hybrid electric vehicle 1 includes an engine 10, a first motor generator (MG) 20, a second MG (motor) 30, a power splitting device 40, a speed reducer 50, a power control unit (PCU) 60, a battery (power storage device) 70, drive wheels 80, a communication device (acquisition unit) 140, and an electronic control unit (ECU) (control device) 200. The hybrid electric vehicle 1 also includes a charging port 160, a charger 170, a power conversion device 180, and a power receiving device 190.

The engine 10, the first MG 20, and the second MG 30 are connected via the power splitting device 40. The hybrid electric vehicle 1 travels with the driving force from at least one of the engine 10 and the second MG 30.

The engine 10 is an internal combustion engine that generates a driving force for rotating a crankshaft by combustion energy that is generated when air-fuel mixture of air and fuel is combusted. The engine 10 is controlled by control signals from the ECU 200. The power splitting device 40 divides the power generated by the engine 10 into a path in which the power is transmitted to the drive wheels 80 and a path in which the power is transmitted to the first MG 20.

The first MG 20 and the second MG 30 are motor generators driven by alternating current. The first MG 20 generates electric power by using the power of the engine 10, which has been divided by the power splitting device 40. The electric power generated by the first MG 20 is supplied to the battery 70 and the second MG 30.

The second MG 30 uses at least one of the electric power supplied from the battery 70 and the electric power generated by the first MG 20 to generate a traveling driving force. The traveling driving force of the second MG 30 is then transmitted to the drive wheels 80. When braking the hybrid electric vehicle 1, the second MG 30 is driven by the drive wheels 80, and the second MG 30 operates as a generator. Accordingly, the second MG 30 functions as a regenerative brake that converts the kinetic energy of the hybrid electric vehicle 1 into electrical energy. The regenerative electric power generated by regenerative electric power generation by the second MG 30 is charged in the battery 70 via the PCU 60. The electric power stored in the battery 70 and the regenerative electric power generated by the first MG 20 and/or the second MG 30 are also supplied to the communication device 140 as needed, as will be described in detail later.

The power splitting device 40 includes planetary gears including a sun gear, a pinion gear, a carrier, and a ring gear. The pinion gear engages with the sun gear and the ring gear. The carrier supports the pinion gear so that the pinion gear rotates on its axis, and the carrier is connected to the crankshaft of the engine 10. The sun gear is connected to a rotation shaft of the first MG 20. The ring gear is connected to a rotation shaft of the second MG 30 and the speed reducer 50.

The PCU 60 is controlled by control signals from the ECU 200. The PCU 60 converts the direct current (DC) power supplied from the battery 70 into alternating current (AC) power that can drive the first MG 20 and the second MG 30. The PCU 60 outputs the converted AC power to each of the first MG 20 and the second MG 30. Accordingly, the first MG 20 and the second MG 30 are driven by the electric power stored in the battery 70. The PCU 60 can also convert the AC power generated by the first MG 20 and the second MG 30 into DC power, and charge the battery 70 with the converted DC power.

The battery 70 is a DC power source that can be charged and discharged, and is composed of, for example, a secondary battery such as a nickel hydrogen battery and a lithium ion battery. The output voltage of the battery 70 is, for example, a high voltage exceeding 200 V. The battery 70 includes a voltage sensor and a current sensor (not shown). The voltage sensor detects the voltage V1 of the battery 70, and the current sensor detects the current I1 that is input/output to/from the battery 70. The detection results of the voltage sensor and the current sensor are output to the ECU 200. A large-capacity capacitor can be used instead of the battery 70.

Electric power can be supplied to the hybrid electric vehicle 1 from power supply equipment 9 or a non-contact power transmission device 8 (see FIG. 3 described later) as power supply equipment outside the vehicle. The charger 170 can receive electric power from the power supply equipment 9. The non-contact power transmission device 8 can transmit electric power to the power receiving device 190. The battery 70 can be charged by the electric power received from the charger 170 or the power receiving device 190. The charging of the battery 70 with the electric power supplied from the power supply equipment 9 or the non-contact power transmission device 8 is also referred to as "external charging" below.

The charging port 160 is a power interface for receiving electric power from the power supply equipment 9. When performing external charging, a connector 300 for supplying electric power from the power supply equipment 9 to the vehicle is connected to the charging port 160. It should be noted that the power supply equipment is not limited to the power supply equipment 9 as shown in FIG. 1, and any external power that can be connected to the connector 300 to supply electric power may be used.

The charger 170 is electrically connected to the charging port 160 and the battery 70. The charger 170 converts the electric power supplied from the power supply equipment 9 into electric power that can charge the battery 70, and charges the battery 70.

The power conversion device 180 is electrically connected to the power receiving device 190 and the battery 70. The power conversion device 180 converts the electric power supplied from the non-contact power transmission device 8 into electric power that can charge the battery 70, and charges the battery 70. Details will be described later with reference to FIG. 3.

Figure 2:
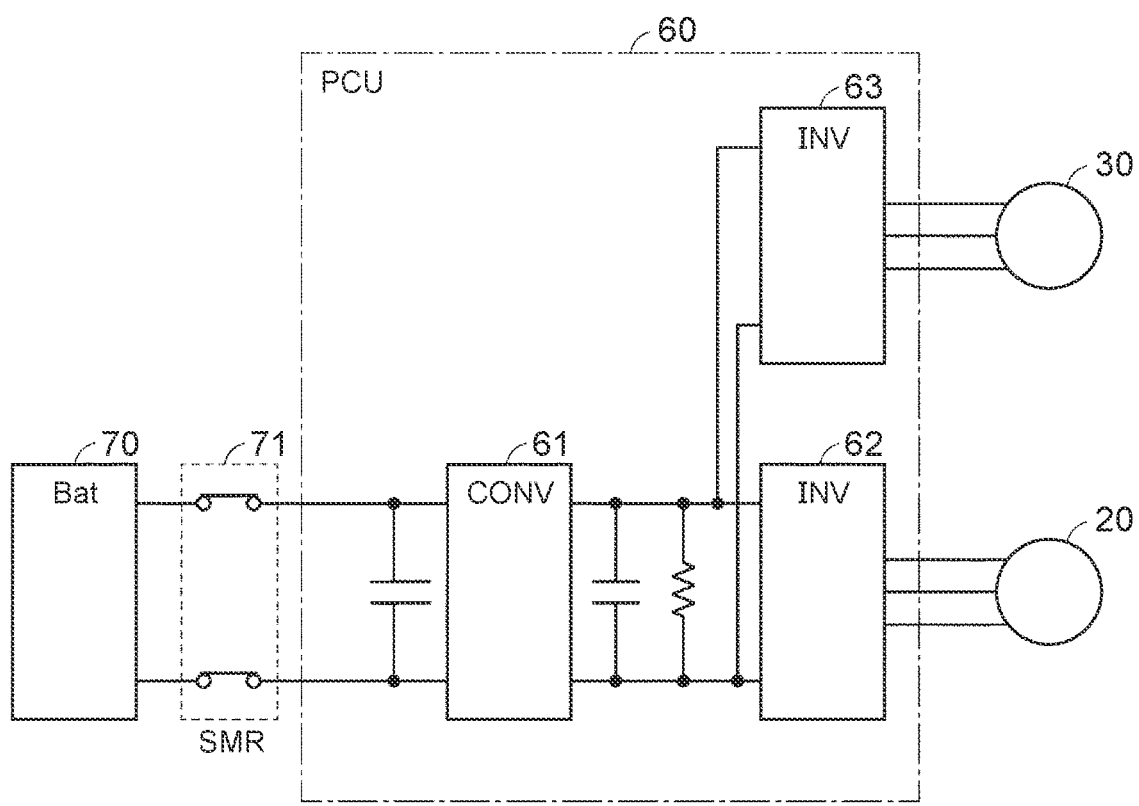
FIG. 2 is a diagram showing circuit configurations of a first motor generator (MG), a second MG, a power control unit (PCU), and a battery.

FIG. 2 is a diagram showing circuit configurations of the first MG 20, the second MG 30, the PCU 60, and the battery 70. As shown in FIG. 2, a system main relay (SMR) 71 is provided between the PCU 60 and the battery 70. The SMR 71 is controlled by control signals from the ECU 200, and switches between supply and cutoff of the electric power between the battery 70 and the PCU 60.

The PCU 60 includes a converter 61 and inverters 62, 63. The converter 61 is provided between the battery 70 and the inverters 62, 63. The converter 61 is controlled by control signals from the ECU 200, and performs voltage conversion between the battery 70 and the inverters 62, 63.

The inverter 62 is provided between the converter 61 and the first MG 20. The inverter 63 is provided between the converter 61 and the second MG 30. The inverters 62, 63 are controlled by control signals from the ECU 200, and convert DC power whose voltage has been converted by the converter 61 into AC power to output the DC power to each of the first MG 20 and the second MG 30.

Returning to FIG. 1, the ECU 200 has a built-in central processing unit (CPU) and a built-in memory (not shown), and is configured to execute a predetermined arithmetic process based on information stored in the memory. Although the ECU 200 is shown as one unit in FIG. 1, the ECU 200 may be divided into two or more units.

The ECU 200 controls the traveling of the vehicle by controlling the first MG 20, the second MG 30, and the engine 10. The ECU 200 also estimates the state of charge (SOC) of the battery 70 based on detection results of the voltage sensor and the current sensor of the battery 70, for example.

Further, the ECU 200 can communicate with a user terminal 500 and a server device 400 via the communication device 140. The user terminal 500 is a terminal used by a user who uses the hybrid electric vehicle 1.

In the present embodiment, the ECU 200 determines whether to perform promotion control based on the user's schedule information acquired from the user terminal 500 and the information acquired from the server device 400. The promotion control will be described in detail with reference to FIG. 5 and later.

The hybrid electric vehicle 1 may be a hybrid electric vehicle (HEV), a plug-in hybrid electric vehicle (PHEV), or the like.

Figure 3:
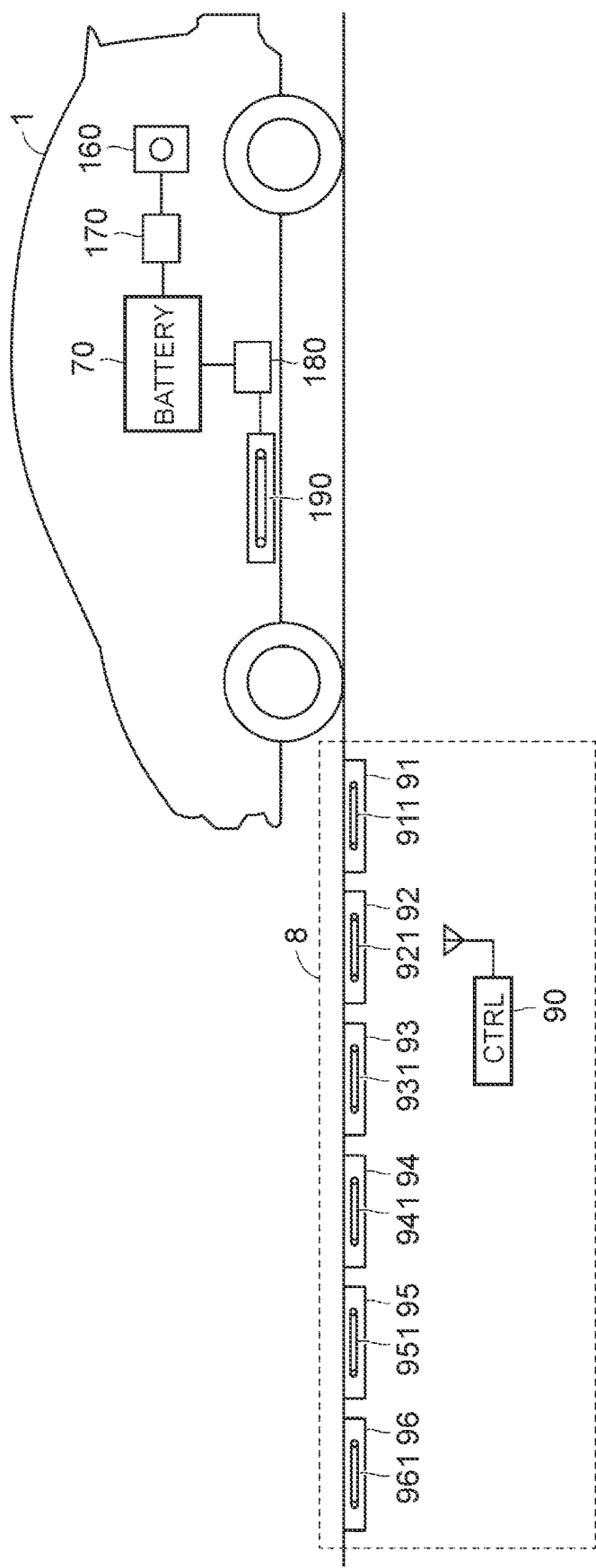
FIG. 3 is a diagram illustrating non-contact power supply of the hybrid electric vehicle.

FIG. 3 is a diagram illustrating non-contact power supply of the hybrid electric vehicle 1. The power receiving device 190 is disposed on the lower surface of the floor panel that constitutes the bottom surface of the hybrid electric vehicle 1. A power receiving coil is housed in the power receiving device 190. The power receiving coil receives the electric power transmitted from the non-contact power transmission device 8 in a non-contact manner.

The non-contact power transmission device 8 includes a plurality of power transmission units 91 to 96 and a controller 90. Although FIG. 3 shows an example in which the number of power transmission units is six, the number of power transmission units is not particularly limited and may be larger.

The power transmission units 91 to 96 are arranged in a row in the traveling lane (which may be on a road surface or a side wall) of the hybrid electric vehicle 1. The power transmission units 91 to 96 include respective power transmission coils 911 to 961. Each power transmission coil 911 to 961 is electrically connected to an AC power source (not shown). Although not shown, each of the power transmission units 91 to 96 is provided with a sensor (an optical sensor, a weight sensor, or the like) for detecting the passage of the hybrid electric vehicle 1.

The controller 90 specifies the traveling position of the hybrid electric vehicle 1 based on the detection signals from each sensor. The controller 90 then supplies AC power from the AC power source to the power transmission coil in the power transmission unit that is located below the hybrid electric vehicle 1, among the power transmission units 91 to 96.

More specifically, for example, when the hybrid electric vehicle 1 is detected above the power transmission unit 91, the controller 90 supplies AC power to the power transmission coil 911. Accordingly, an alternating current flows through the power transmission coil 911, which forms an electromagnetic field around the power transmission coil 911. The power receiving coil in the power receiving device 190 receives electric power in a non-contact manner through the electromagnetic field. Subsequently, when the hybrid electric vehicle 1 is no longer detected above the power transmission unit 91, the controller 90 stops supplying AC power to the power transmission coil 911. By performing such a series of control for each of the power transmission units 91 to 96, electric power can be transmitted to the traveling hybrid electric vehicle 1 in a non-contact manner. The power receiving device 190 supplies the electric power from the non-contact power transmission device 8 to the battery 70 via the power conversion device 180.

Normal Control/Promotion Control, CD/CS Mode

The ECU 200 controls the hybrid electric vehicle 1 to either a charge depleting (CD) mode or a charge sustaining (CS) mode. For example, it is assumed that the hybrid electric vehicle 1 is controlled to the CD mode after the battery 70 is charged to an amount equal to or larger than a predetermined amount (for example, fully charged) by external charging. The ECU 200 switches from the CD mode to the CS mode when the SOC of the battery 70 drops to a predetermined threshold value (hereinafter, also simply referred to as "SL").

In addition, the ECU 200 controls the hybrid electric vehicle 1 to either normal control or promotion control. The promotion control is control that increases the usage ratio of the engine, among the motor and the engine, compared to the normal control. Specifically, in the promotion control, the ratio of control to the CS mode is higher than that in the normal control, thereby increasing the usage ratio of the engine.

Figure 4:
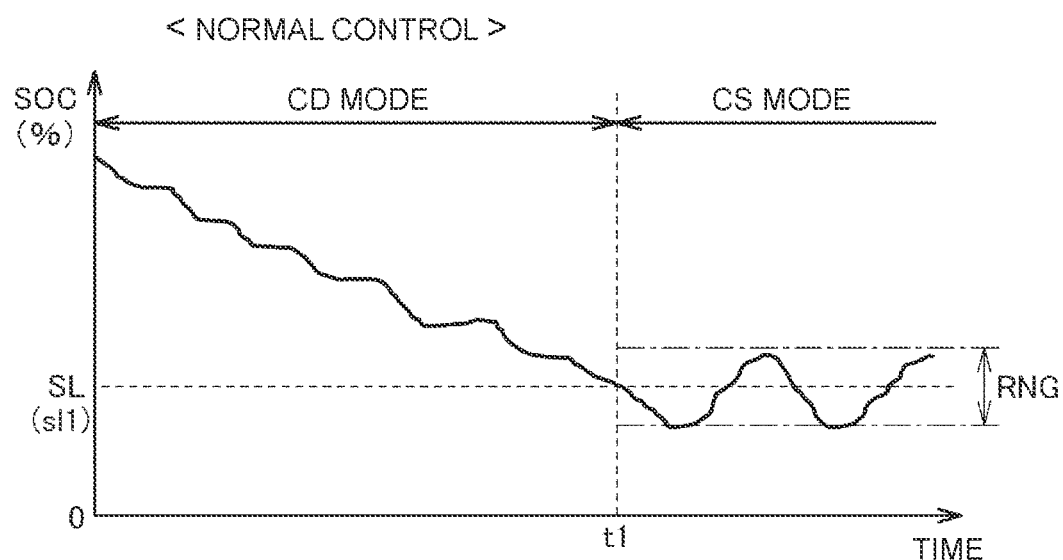
FIG. 4 is a graph illustrating a charge depleting (CD) mode and a charge sustaining (CS) mode in normal control.

FIG. 4 is a diagram illustrating the CD mode and the CS mode in the normal control.

The CD mode is a mode in which the SOC is consumed, and basically the electric power (mainly electric energy by external charging) stored in the battery 70 is consumed. When traveling in the CD mode, the engine 10 does not operate in order to maintain the SOC. Thus, although the SOC may temporarily increase due to the regenerative electric power recovered during deceleration or the like of the vehicle or the electric power generated by the operation of the engine 10, the discharge rate becomes relatively higher than the charge rate, and as a whole, the SOC decreases as the traveling distance increases.

The CS mode is a mode for maintaining the SOC at a predetermined level. As an example, when the SOC drops to SL (SL=sl1 in the normal mode) at time t1, the CS mode is selected, and the subsequent SOC is controlled within the control range RNG. Specifically, when the SOC reaches the lower limit of the control range RNG (engine start threshold value), the engine 10 operates, and when the SOC reaches the upper limit of the control range RNG, the engine 10 stops. In this way, the SOC is controlled within the control range RNG by appropriately repeating the operation and stop of the engine 10 (intermittent operation). As described above, in the CS mode, the engine 10 is operated in order to maintain the SOC.

Even in the CD mode, the engine 10 operates when a large driving force is required. On the other hand, even in the CS mode, when the SOC rises, the engine 10 stops. That is, the CD mode is not limited to EV traveling in which the engine 10 is constantly stopped, and the CS mode is not limited to HV traveling in which the engine 10 is constantly operated. EV traveling and HV traveling can be performed in both the CD mode and the CS mode.

Figure 5:
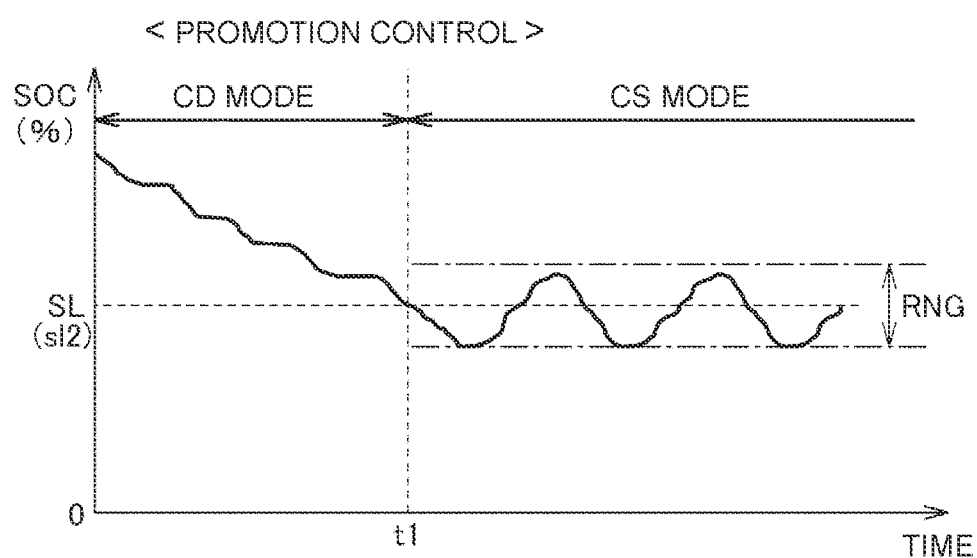
FIG. 5 is a graph illustrating the CD mode and the CS mode in promotion control.

FIG. 5 is a diagram illustrating the CD mode and the CS mode in the promotion control. When the control is switched from the normal control to the promotion control, the SL fluctuates to a value equal to or higher than the SL (sl1) in the normal control, so that the control ratio to the CS mode (the usage ratio of the engine) increases.

For example, it is assumed that the SL is set to sl2, which is larger than sl1, under the control of the promotion control. In this case, as compared with FIG. 4, the timing (time t1) for switching from the CD mode to the CS mode is earlier.

Also in FIG. 5, similarly to FIG. 4, when the SOC reaches the lower limit of the control range RNG (engine start threshold value), the engine 10 operates, and when the SOC reaches the upper limit of the control range RNG, the engine 10 stops. The control range RNG also rises with the rise of the SL.

As a result, in the case of traveling a long distance without external charging, the mode is switched to the CS mode in the promotion control at an earlier timing (shorter distance) than in the normal control. Among the CD mode and the CS mode, the ratio in which the mode is controlled to the CS mode becomes high.

Schedule Information

As described above, the ECU 200 determines whether to perform the promotion control based on the schedule information or the like acquired from the user terminal 500. Here, the "schedule information" is information in which the schedule of the user who uses the hybrid electric vehicle 1, which is managed by schedule management software, is recorded.

The schedule management software is software installed on the user terminal 500. The schedule management software may be any schedule management software installed on a smartphone. The schedule management software may be dedicated software installed for communication with the ECU 200, or may be general schedule management software such as that installed by default on a smartphone.

The user who uses the hybrid electric vehicle 1 manages the user's schedule by using the schedule management software. FIG. 6 is a diagram illustrating an example of the schedule information displayed on the user terminal 500. For example, as shown in FIG. 6, the screen of the user terminal 500 displays a calendar for a designated month and a user's schedule.

In this example, the schedule around October 2021 is displayed. The user has registered "B City in A Prefecture" as a schedule for "September 30th". The user is scheduled to go to B City in A Prefecture on September 30th. The user has registered "Business trip to Company C" as a schedule for "October 4th". The user is planning a business trip to Company C on October 4th.

The user has registered "Trip to Hot Spring D" as a schedule for "October 9th". The user is planning a trip to Hot Spring D on October 9th. The user has registered "Thorough cleaning" as a schedule for "October 13th". The user is planning to thoroughly clean his/her house on October 13th.

The user has registered "Lesson in classroom E" as a schedule for "October 15th". The user is planning a lesson (for example, an English conversation lesson) in classroom E on October 15th. The user has registered "G City in F Prefecture" as a schedule for "October 17th". The user is scheduled to go to G City in F Prefecture on October 17th.

The user has registered "Hospital H" as a schedule for "October 26th". The user is scheduled to be examined at Hospital H on October 26th. The user has registered "Amusement Park I" as a schedule for "October 30th". The user is scheduled to go to Amusement Park I on October 30th. Other schedules are also registered on September 28th, October 7th, and the like.

Flowchart

In the present embodiment, the ECU 200 determines whether the remaining amount of fuel becomes equal to or less than a predetermined amount indicating a decrease in fuel by a predetermined deterioration time based on the traveling distance in the long-distance traveling schedule (more specifically, the traveling distance in the CS mode in the long-distance traveling schedule).

The long-distance traveling schedule is a schedule that is included in the traveling schedule and in which the hybrid electric vehicle 1 travels for a predetermined distance or longer. Here, "traveling schedule" refers to the schedule for causing the hybrid electric vehicle 1 to travel in a predetermined period, of the schedule information. For example, the scheduled "Thorough cleaning" does not correspond to a traveling schedule because the user does not plan to cause the hybrid electric vehicle 1 to travel.

The "predetermined distance" is an average value of the distance that can be traveled when traveling is started from the fully charged state to the time when the SOC reaches the SL (sl1) in the normal control (the average traveling distance until the mode is switched to the CS mode). In other words, the long-distance traveling schedule is a traveling schedule in which fuel consumption is generated by controlling to the CS mode.

The "predetermined period" is a period from when the fuel of the engine 10 is refueled to a predetermined deterioration time. The predetermined deterioration time (hereinafter, also simply referred to as "deterioration time") is a time when it is determined that the quality of the fuel has deteriorated due to aged deterioration. In the present embodiment, the predetermined deterioration time is "1 year". The predetermined deterioration time is not limited to this, and may be estimated by using some known method.

The "predetermined amount" indicating a decrease in fuel is the remaining amount of fuel serving as a guide for the user to refuel due to the small remaining amount of fuel.

When the ECU 200 determines that the remaining amount of fuel does not become equal to or lower than the predetermined amount, the ECU 200 performs the promotion control in the predetermined period. That is, the ECU 200 estimates the fuel consumption amount in the CS mode in the long-distance traveling schedule up to the deterioration time. Based on the fuel consumption amount, the ECU 200 then performs the promotion control for promoting fuel consumption when it is predicted that the user will not refuel by the deterioration time.

Figure 7:
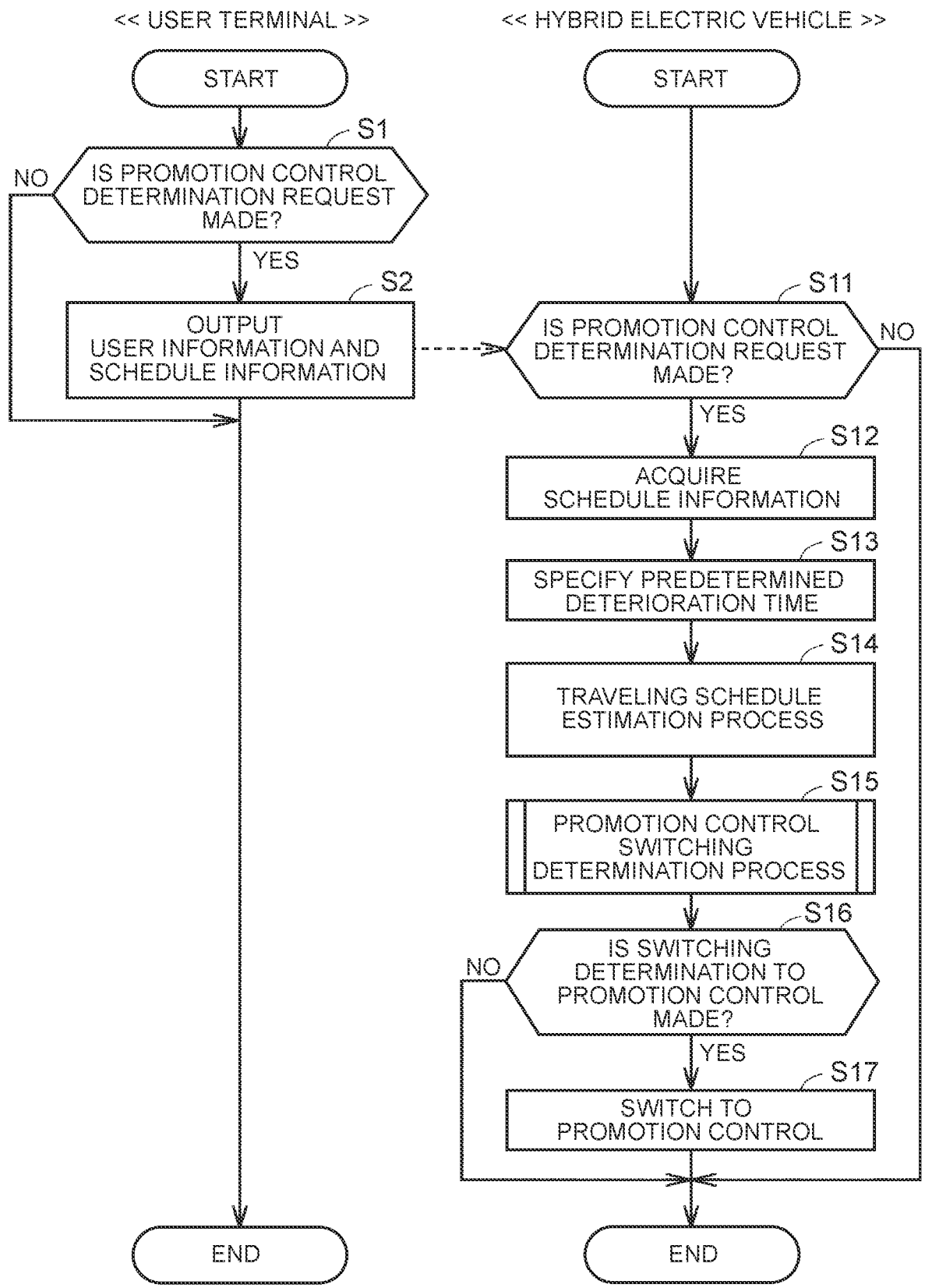
FIG. 7 is a flowchart showing a processing procedure of processes executed by the user terminal and the hybrid electric vehicle.

Hereinafter, the processing procedure of the processes executed by the user terminal 500, the hybrid electric vehicle 1, and the server device 400 will be described with reference to the flowchart. FIG. 7 is a flowchart showing a processing procedure of processes executed by the user terminal 500 and the hybrid electric vehicle 1. The flowchart is called from a main routine (not shown) and executed when, for example, a predetermined condition is satisfied.

In FIG. 7, the process executed by the user terminal 500 is shown on the left side, and the process executed by the hybrid electric vehicle 1 is shown on the right side. Each step is realized by software processing by the user terminal 500 or the hybrid electric vehicle 1, but may be realized by hardware such as large scale integration (LSI) mounted on the user terminal 500 or the hybrid electric vehicle 1. Hereinafter, the step is abbreviated as S.

In the present embodiment, the user can cause the hybrid electric vehicle 1 to determine whether to switch to the promotion control. At that time, the user connects the user terminal 500 and the ECU 200 of the hybrid electric vehicle 1 through communication to cause the hybrid electric vehicle 1 to make the determination.

The user terminal 500 and the ECU 200 may be connected by using some dedicated software, or may be connected by accessing a predetermined URL. A promotion control determination request can then be transmitted to the ECU 200 by the operation from the user terminal 500. With this as a trigger, the ECU 200 determines whether to switch to the promotion control.

When the process in the user terminal 500 starts, in S1, the user terminal 500 determines whether the promotion control determination request has been made. When it is determined that the promotion control determination request has been made (YES in S1), the user terminal 500 advances the process to S2. When it is not determined that the promotion control determination request has been made (NO in S1), the user terminal 500 returns the process to the main routine.

In S2, the user terminal 500 outputs the user information and the schedule information, and returns the process to the main routine. The schedule information is, for example, the schedule information of the user, which is stored in the schedule management software shown in FIG. 6. The user information includes a search history and user's location information described later. The user's location information is the location of the user's home (the location of the hybrid electric vehicle 1).

When the process in the hybrid electric vehicle 1 starts, in S11, the ECU 200 of the hybrid electric vehicle 1 determines whether the promotion control determination request has been made. When it is determined that the promotion control determination request has been made (YES in S11), the ECU 200 advances the process to S12. When it is not determined that the promotion control determination request has been made (NO in S11), the ECU 200 returns the process to the main routine.

In S12, the ECU 200 acquires the schedule information via the communication device 140. The schedule information is, for example. "B City in A Prefecture" scheduled on "September 30th", "Business trip to Company C" scheduled on "October 4th", "Trip to Hot Spring D" scheduled on "October 9th", "Thorough cleaning" scheduled on "October 13th", "Lesson in classroom E" scheduled on "October 15th", "G City in F Prefecture" scheduled on "October 17th", "Hospital H" scheduled on "October 26th", "Amusement Park I" scheduled on "October 30th", and the like.

In S13, the ECU 200 specifies a predetermined deterioration time. In the present embodiment, the predetermined deterioration time is "one year after" the previous refueling.

Figure 8:
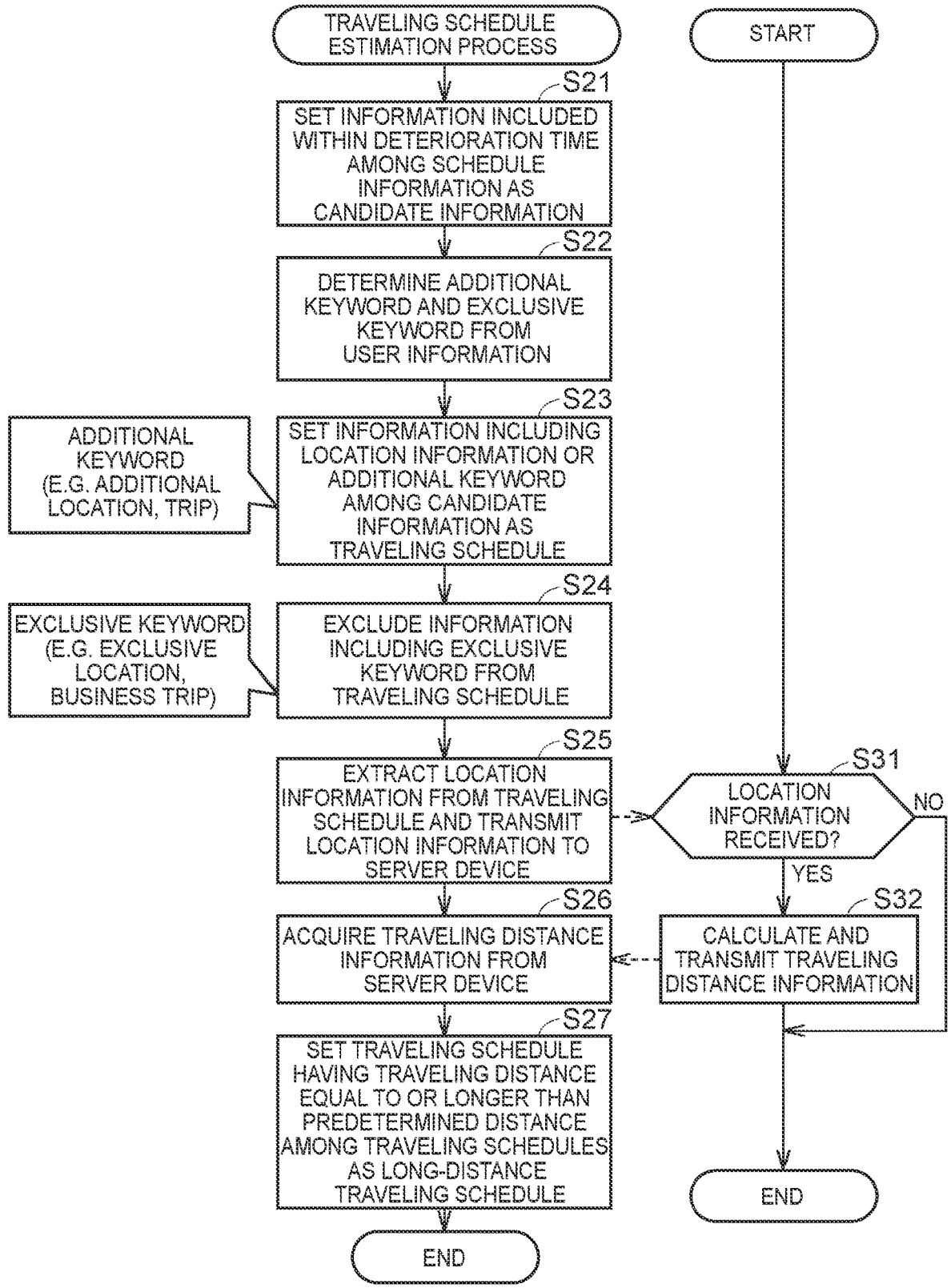
FIG. 8 is a flowchart showing a processing procedure of a traveling schedule estimation process.

In S14, the ECU 200 performs a traveling schedule estimation process (see FIG. 8). Accordingly, the long-distance traveling schedule information is set. In S15, the ECU 200 executes a promotion control switching determination process (see FIG. 9). Accordingly, it is determined whether to switch to the promotion control based on the long-distance traveling schedule information.

In S16, the ECU 200 determines whether a switching determination to the promotion control has been made. When it is determined that the switching determination to the promotion control has been made (YES in S16), the ECU 200 advances the process to S17. When it is not determined that the switching determination to the promotion control has been made (NO in S16), the ECU 200 returns the process to the main routine. In S17, the ECU 200 switches the hybrid electric vehicle 1 from the normal control to the promotion control, and returns the process to the main routine.

FIG. 8 is a flowchart showing a processing procedure of the traveling schedule estimation process. When the traveling schedule estimation process starts, in S21, the ECU 200 sets schedules included within the deterioration time (one year after refueling), among the schedule information, as the candidate information.

In S22, the ECU 200 determines an additional keyword and an exclusive keyword from the user information. The additional keyword is a keyword for determining that the schedule is a traveling schedule, among the schedules included in the candidate information. The exclusive keyword is a keyword for excluding the schedule from the traveling schedule, among the schedules included in the candidate information.

The user information is, for example, the search history or the like in search software such as map software and transportation transfer guidance software installed in the user terminal 500. The user's behavior pattern is predicted from these user information to determine the additional keyword and the exclusive keyword.

The additional keyword is, for example, "trip" or "additional location". For example, if there is a history of the user searching the traveling route of a vehicle for locations A1 to AN in the map software in the past, the locations A1 to AN (including "B City in A Prefecture" in this example) are set as the additional keyword. Further, for example, it is assumed that a traveling route of a vehicle is searched with a high probability of a predetermined probability or more for a plurality of past schedules of "Trip to XX" (destination+trip). In this case, the ECU 200 determines that the user is likely to use the vehicle during a trip, and thus when the schedule includes the keyword "trip", the ECU 200 determines that the schedule is a traveling schedule.

The exclusive keyword is, for example, "business trip" or "exclusive location". For example, when there is a history of the user searching the route of transportation (train or the like) for locations B1 to BM in the map software or the transportation transfer guidance software in the past, the locations B1 to BM (including "Classroom E" and "Hospital H" in this example) are set as the exclusive keyword. Further, for example, it is assumed that a transportation route is searched with a high probability of a predetermined probability or more for a plurality of past schedules of "Business trip to XX" (destination+business trip). In this case, the ECU 200 determines that the user is likely to use transportation during a business trip, and thus when the schedule includes the keyword "business trip", the ECU 200 determines that the schedule is not a traveling schedule.

In addition, the ECU 200 may determine whether to include keywords such as "classroom", "lesson", and "hospital" in the additional keyword or the exclusive keyword by the above method.

In S23, the ECU 200 sets the information including the location information or the additional keyword, among the candidate information, as the traveling schedule. For example, in the example of FIG. 6, "Trip to Hot Spring D" including the keyword "trip", "B City in A Prefecture" included in "additional location", and "Business trip to Company C", "Lesson in classroom E", "G City in F Prefecture", "Hospital H", and "Amusement Park I" including the location information are included in the traveling schedule. On the other hand, "Thorough cleaning" is not set as the traveling schedule.

In S24, the ECU 200 excludes the information including the exclusive keyword from the traveling schedule. In the above, "Business trip to Company C" including the keyword "business trip", and "Lesson in classroom E" and "Hospital H" included in "exclusive location" are excluded, so that "Trip to Hot Spring D", "B City in A Prefecture", "G City in F Prefecture", and "Amusement Park I" are set as the traveling schedule.

In this way, the ECU 200 determines whether the schedule corresponds to the traveling schedule based on the keywords (additional keyword or exclusive keyword) included in the schedule information.

In S25, the ECU 200 extracts the location information from the traveling schedule and transmits the location information to the server device 400. In the above example, the ECU 200 transmits "B City in A Prefecture", "Trip to Hot Spring D", "G City in F Prefecture", "Amusement Park I", and the user's location information as the location information.

When the process in the server device 400 starts, in S31, the server device 400 determines whether the location information has been received. When it is determined that the location information has been received (YES in S31), the server device 400 advances the process to S32. When it is not determined that the location information has been received (NO in S31), the server device 400 returns the process to the main routine.

In S32, the server device 400 calculates and transmits the traveling distance information based on the location information, and returns the process to the main routine. Here, the server device 400 specifies an address (location information) from a location name or a facility name. The server device 400 also specifies the traveling mute of the vehicle from the position information of two points and specifies the traveling distance of the traveling route.

In the above example, the server device 400 specifies the location information (address) of "Hot Spring D" from the facility name "Hot Spring D". The server device 400 specifies the location information of "Amusement Park I" from the facility name "Amusement Park I".

Next, the server device 400 specifies the traveling route and the traveling distance from the user's location to B City in A Prefecture. Similarly, the server device 400 specifies the traveling route and the traveling distance from the user's location to the Hot Spring D, from the user's location to G City in F Prefecture, and from the user's location to the Amusement Park I.

The server device 400 transmits each traveling distance specified above as the traveling distance information. In S26 of the hybrid electric vehicle 1, the ECU 200 acquires the traveling distance information from the server device 400. As described above, when the schedule information includes the information about the location, the ECU 200 acquires the traveling distance from the server device 400 based on the information about the location.

In S27, the ECU 200 sets a traveling schedule having a traveling distance equal to or longer than a predetermined distance ("SD" described later in this example), among the traveling schedules, as a long-distance traveling schedule, and ends the traveling schedule estimation process.

In this example, it is assumed that the traveling distances of the traveling schedules "Trip to Hot Spring D", "G City in F Prefecture", and "Amusement Park I" are equal to or longer than the SD, and the traveling distance of the traveling schedule "B City in A Prefecture" is less than the SD. In this case, the ECU 200 sets the traveling schedules "Trip to Hot Spring D", "G City in F Prefecture", and "Amusement Park I" as the long-distance traveling schedules.

Figure 9:
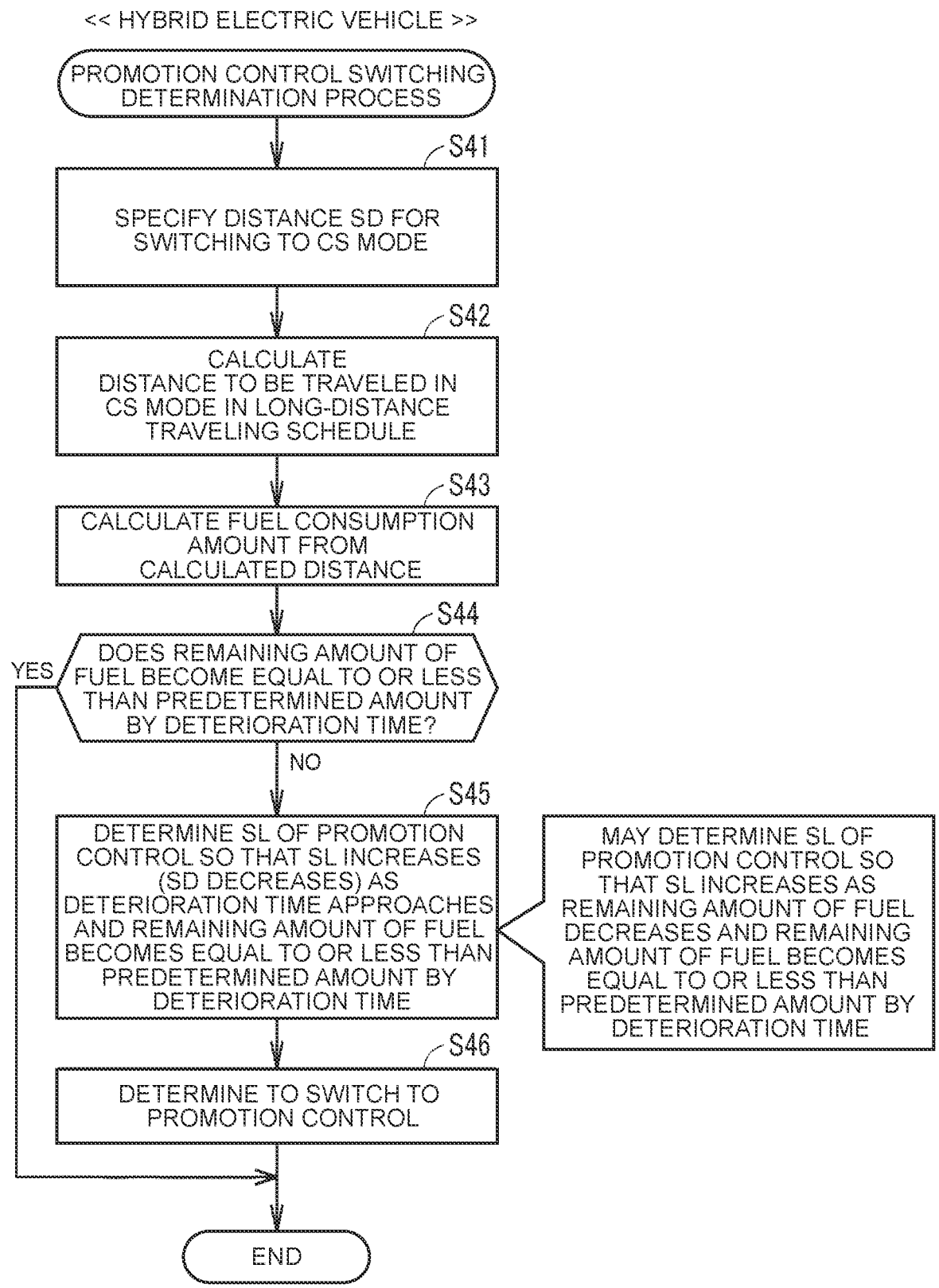
FIG. 9 is a flowchart showing a processing procedure of a promotion control switching determination process.

FIG. 9 is a flowchart showing a processing procedure of the promotion control switching determination process. When the promotion control switching determination process starts, in S41, the ECU 200 specifies the distance SD for switching to the CS mode. In S42, the ECU 200 calculates the distance to be traveled in the CS mode in the long-distance traveling schedule. In S43, the ECU 200 calculates the fuel consumption amount from the calculated distance.

Figure 10:
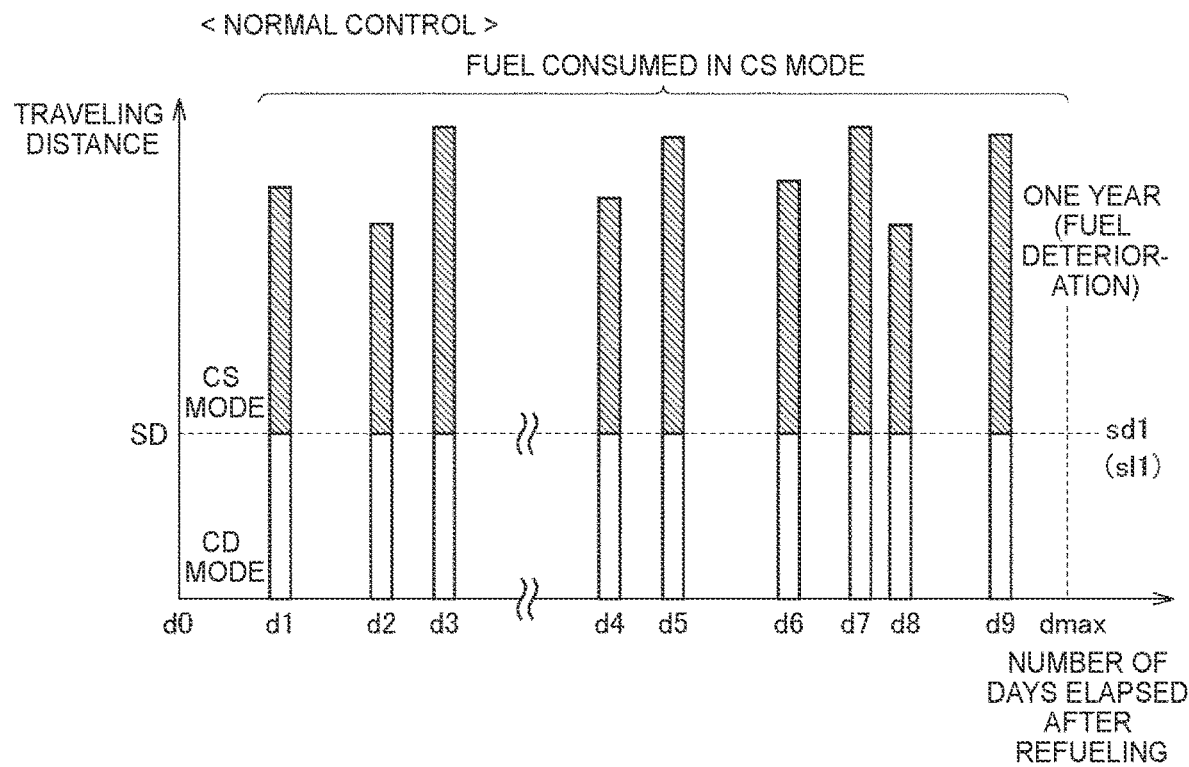
FIG. 10 is a graph illustrating a long-distance traveling schedule up to a fuel deterioration time in the normal control.
Figure 11:
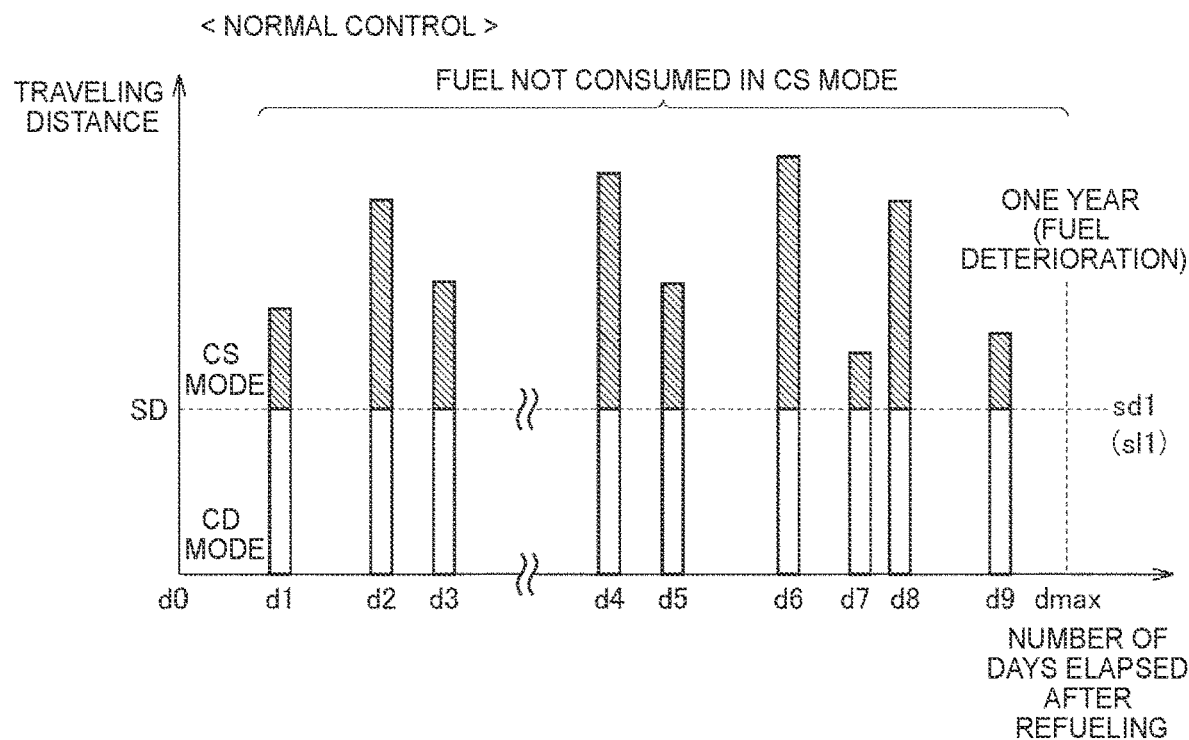
FIG. 11 is a graph illustrating the long-distance traveling schedule up to the fuel deterioration time in the normal control.

The processes of S41 to S43 will be described with reference to FIGS. 10 and 11. FIGS. 10 and 11 are graphs illustrating a long-distance traveling schedule up to the fuel deterioration time (one year after refueling in the present embodiment) in the normal control. FIG. 10 shows an example in which the remaining amount of fuel becomes an amount equal to or less than a predetermined amount (the user performs refueling) by the deterioration time, and FIG. 11 shows an example in which the remaining amount of fuel does not become an amount equal to or less than a predetermined amount by the deterioration time (the user does not perform refueling).

As shown in FIG. 10, in this example, it is assumed that there is a long-distance traveling schedule when the number of days elapsed after refueling is at least d1 to d9. For example, it is assumed that the above-described long-distance traveling schedules "Trip to Hot Spring D", "G City in F Prefecture", and "Amusement Park I" correspond to the long-distance traveling schedules at d7, d8, and d9, respectively.

In this example, it is assumed that the deterioration time (dmax that is one year after refueling) is reached slightly after d9 in the number of days elapsed after refueling. As shown in FIG. 4, in the long-distance traveling schedule, when the SOC drops to the SL, the CD mode is switched to the CS mode.

In the present embodiment, in the long-distance traveling schedule, the average traveling distance from starting traveling in the CD mode in a fully charged state to switching to the CS mode is defined as SD. In FIG. 4, the SD corresponds to the average traveling distance from the fully charged state of the SOC to the decrease of the SOC to the SL.

For example, in the long-distance traveling schedule of d1, the mode is controlled to the CD mode until the traveling distance reaches the SD, and the mode is controlled to the CS mode when the traveling distance is equal to or longer than the SD. The same applies to the long-distance traveling schedule of d2. Since the traveling distance of d2 is shorter than that of d1, the period controlled to the CS mode is also shorter. Hereinafter, the same applies to d3 to d9.

In all long-distance traveling schedules including d1 to d9, fuel is consumed as shown in FIG. 4 in a state controlled to the CS mode. The fuel consumption amount up to the deterioration time can be calculated from the traveling distance in the CS mode in all the long-distance traveling schedules including d1 to d9. By calculating the fuel consumption amount, it is possible to determine whether the remaining amount of fuel becomes equal to or less than a predetermined amount by the deterioration time.

Here, the average fuel consumption amount per 1 km traveling in the CS mode is calculated in advance. Calculation is made as below: average fuel consumption amount× traveling distance in CS mode in long-distance traveling schedule=fuel consumption amount up to deterioration time. In this example, the fuel consumed in the CD mode is not considered, but the fuel consumption amount may be calculated including the fuel consumed in the CD mode.

In this example, it is assumed that the remaining amount of fuel is equal to or less than a predetermined amount in a long-distance traveling schedule of d8. In this case, it is conceivable that the user performs refueling during traveling of d8 or during traveling at an earlier timing. When refueling is performed at this timing, the effect of fuel deterioration does not occur because the timing is before the deterioration time.

In FIG. 11, as in FIG. 10, it is assumed that there is a long-distance traveling schedule when the number of days elapsed after refueling is at least d1 to d9. However, in FIG. 11, the traveling distances in the long-distance traveling schedules are shorter as a whole than in the example of FIG. 10.

Also in this example, calculation is made as below: traveling distance in CS mode in all long-distance traveling schedules including d1 to d9×average fuel consumption amount=fuel consumption amount up to deterioration time. In this example, the remaining amount of fuel calculated based on the fuel consumption amount does not becomes equal to or less than the predetermined amount by the deterioration time. Therefore, it is presumed that the hybrid electric vehicle 1 is used without being refueled even in a state where the fuel is deteriorated.

When the ECU 200 determines that the remaining amount of fuel does not become equal to or less than the predetermined amount by the deterioration time, the ECU 200 performs the promotion control for increasing the SL (lowering the SD) in the predetermined period. Specifically, the following process is performed.

Returning to FIG. 9, in S44, the ECU 200 determines whether the remaining amount of fuel becomes equal to or less than the predetermined amount by the deterioration time. When the ECU 200 determines that the remaining amount of fuel becomes equal to or less than the predetermined amount by the deterioration time (YES in S44), the ECU 200 ends the promotion control switching determination process. The example of FIG. 10 corresponds to this.

When the ECU 200 determines that the remaining amount of fuel does not become equal to less than the predetermined amount by the deterioration time (NO in S44), the ECU 200 advances the process to S45. The example of FIG. 11 corresponds to this.

In S45, the ECU 200 determines the SL of the promotion control so that the SL increases (the SD decreases) as the deterioration time approaches and the remaining amount of fuel becomes equal to or less than the predetermined amount by the deterioration time. In 546, the ECU 200 determines to switch to the promotion control, and ends the promotion control switching determination process.

Figure 12:
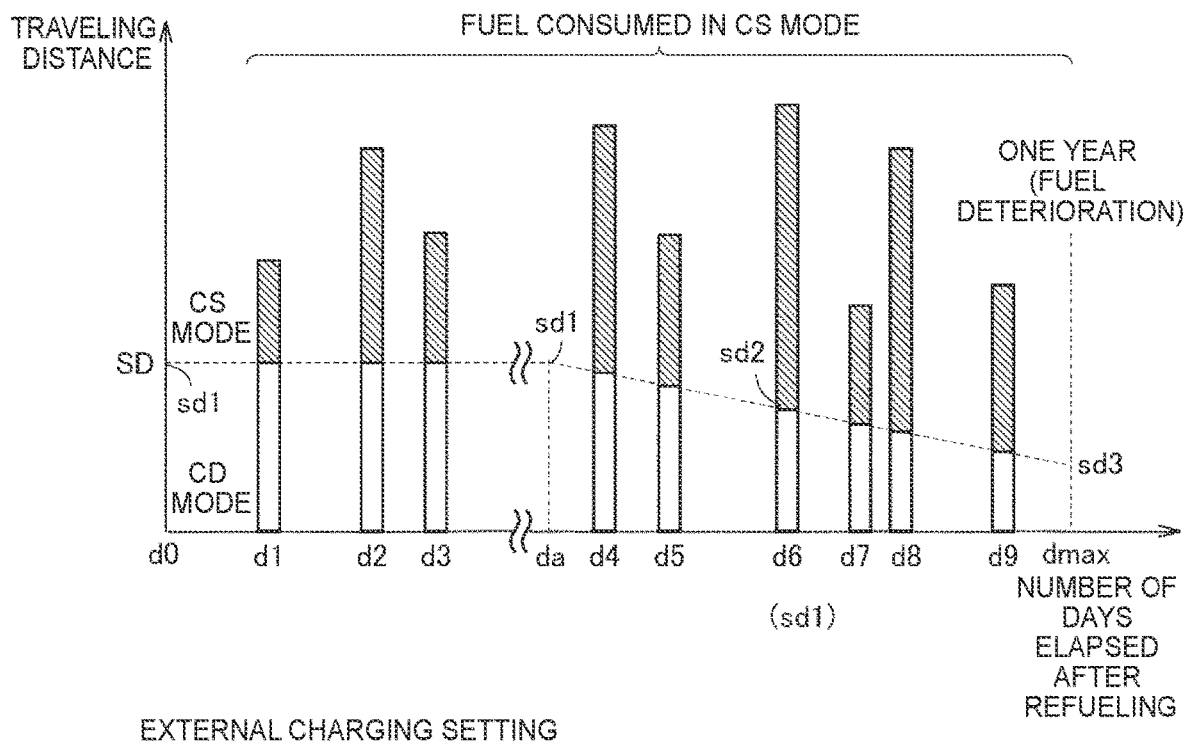
FIG. 12 is a graph illustrating the long-distance traveling schedule up to the fuel deterioration time in the promotion control.

Hereinafter, a specific example of the process of S45 will be described with reference to FIG. 12. When it is estimated that the remaining amount of fuel does not become equal to or less than the predetermined amount (the user does not perform refueling) even after the deterioration time in the normal control as in the example of FIG. 11, the normal control is switched to the promotion control. FIG. 12 is a graph illustrating the long-distance traveling schedule up to the fuel deterioration time in the promotion control.

As shown in FIG. 12, when the normal control is switched to the promotion control, the SD decreases (in other words, the SL increases) as the deterioration time approaches. In this example, from d1 to d3, the SD (=sd1) is the same (the SL (=sl1) is the same) in the normal control and the promotion control.

Subsequently, as the time approaches d4, the SD starts to decrease (the SL starts to increase) in the promotion control, the SD continues to decrease (the SL continues to increase) at d5, d6, d7, d8, and d9, and the SD becomes the lowest (the SL becomes the highest) at d9.

Specifically, SD=sd1 and SL=sl1 (first threshold value) hold when the number of days elapsed after refueling is d0 to da, SD=sd2 and SL=sl2 (second threshold value) hold at d6 (first time period), and SD=sd3 and SL=sl3 (third threshold value) hold at dmax (second time period). Here, the relationship of sd1>sd2>sd3 and the relationship of sl1<sl2<sl3 are established.

When the promotion control is not performed (the case of FIG. 10), the ECU 200 uses the sl1 for the predetermined period. On the other hand, when the promotion control is performed (the case of FIG. 12), the ECU 200 uses the sl2 that is smaller than the sl1 at d6 in the predetermined period, and uses the sl3 that is smaller than the sl2 at dmax after d6 in the predetermined period.

In this way, the ratio for controlling to the CS mode increases as the deterioration time approaches, so that the fuel consumption is further promoted near the deterioration time. The SD in the promotion control is set so that the remaining amount of fuel is equal to or less than the predetermined amount in all long-distance traveling schedules including d1 to d9 up to the fuel deterioration time.

Further, when the promotion control is performed, the ECU 200 restricts external charging from a non-contact power supply equipment such as the non-contact power transmission device 8 or the contact power supply equipment such as the power supply equipment 9. Specifically, in the promotion control, the upper limit value for charging is lower than that in the normal control in charging from any power supply equipment. In the example of FIG. 4, the upper limit value of the SOC is restricted so that the SOC is not fully charged. Accordingly, it is easier to switch to the CS mode in the promotion control than in the normal control, and the fuel consumption is promoted.

Further, in the case where the power receiving device 190 receives electric power from the non-contact power transmission device 8 arranged on the traveling path (in the case of charging during traveling) while the hybrid electric vehicle 1 is traveling, when the promotion control is being executed, the ECU 200 makes the charging amount per unit time less than when the promotion control is not being executed.

Accordingly, the charging amount from the non-contact power transmission device 8 arranged on the traveling path is reduced. The charging amount per unit time may be set to zero so that the non-contact power transmission device 8 does not charge the hybrid electric vehicle 1 during traveling. Accordingly, it is easier to switch to the CS mode in the promotion control than in the normal control, and the fuel consumption is promoted.

The method for restricting the external charging when performing the promotion control is not limited to the above. For example, the external charging may not be restricted when charging at home, and may be restricted when charging outside the home. Further, the restriction may be such that the non-contact external charging is not allowed at all.

As shown above, when the traveling distance in the long-distance traveling schedule is the sum of the traveling distances from d1 to d9 and the like shown in FIG. 12 (referred to as "first distance"), the ECU 200 performs control for increasing the usage ratio of the engine 10 (control for increasing the ratio for controlling to the CS mode) in the predetermined period from when the fuel of the engine 10 is refueled to the predetermined deterioration time, than when the traveling distance in the long-distance traveling schedule is the sum of the traveling distances from d1 to d9 and the like shown in FIG. 10 (referred to as "second distance"), which is larger than the first distance. In this way, since the usage ratio of the engine 10 is adjusted in consideration of the actual long-distance traveling schedule in which fuel consumption occurs, it is possible to reduce unnecessary use of the engine 10 (reduce controlling to the CS mode). Further, by restricting the charging from the outside during the execution of the promotion control and reducing the charging amount per unit time in charging during traveling, the control ratio to the CS mode can be increased. As a result, it is possible to increase the traveling ratio by electric power while suppressing the deterioration of fuel.

In addition, since the fuel consumption amount is increased as the deterioration time approaches in the promotion control, the fuel consumption can be reduced as much as possible in a time far from the deterioration time with large uncertainties, and the fuel can be reliably consumed around the deterioration time. Further, it is not necessary for the user to set the traveling distance or whether the schedule is the traveling schedule, and the information of the existing schedule management software is diverted, so that the user's setting burden can be reduced.

In S45, the ECU 200 may determine the SL of the promotion control so that the SL increases as the remaining amount of fuel decreases and the remaining amount of fuel becomes equal to or less than the predetermined amount by the deterioration time.

Specifically, the ECU 200 uses the sl1 as the SL in the predetermined period when the promotion control is not performed. With the remaining amount at the time of refueling considered as X0, it is assumed that the following relationship is established.

$$X0 > X1 > X2 > \text{predetermined amount}$$

When the promotion control is performed, the ECU 200 uses the sl2 (>sl1) when the remaining amount is X1 (first amount), and uses the sl3 (>sl2) when the remaining amount is X2 (second amount). Accordingly, since the fuel consumption amount is increased as the remaining amount decreases in the promotion control, the fuel consumption can be reduced as much as possible in the initial stage with large uncertainties, and the fuel can be reliably consumed when the remaining amount is low.

Second Embodiment

Hereinafter, a second embodiment will be described. In the description of the second embodiment, the differences from the first embodiment will be described, and description on the common parts will be omitted.

In the first embodiment, in the traveling schedule estimation process (FIG. 8), the ECU 200 determines whether the schedule corresponds to the traveling schedule based on the keywords (additional keyword or exclusive keyword) included in the schedule information.

On the other hand, in the second embodiment, when the schedule information includes the information about the location, the ECU 200 acquires the traveling distance based on the information about the location and determines whether the schedule corresponds to the traveling schedule based on the traveling distance. Hereinafter, the description will be made with reference to the flowchart of FIG. 13.

Figure 13:
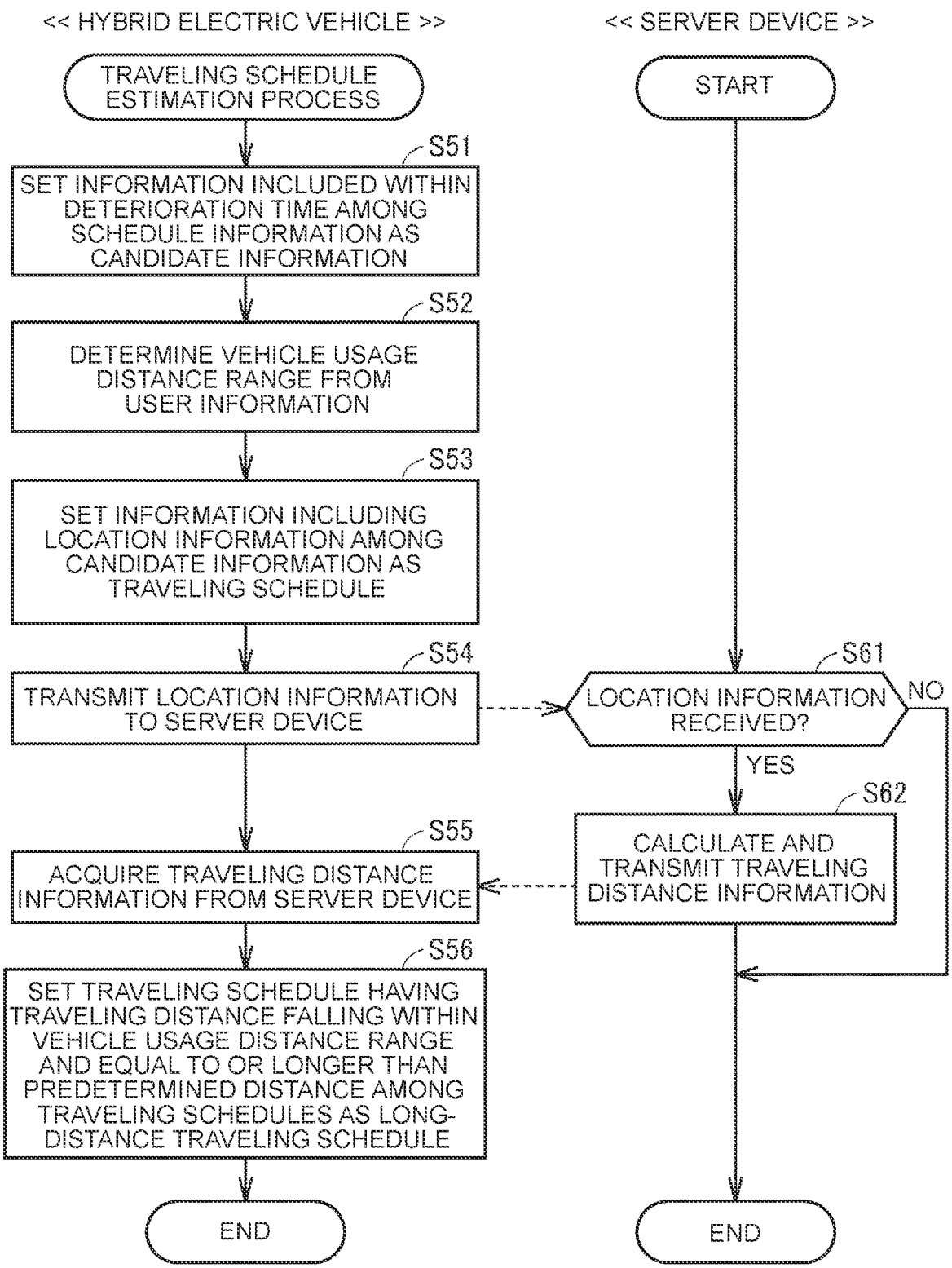
FIG. 13 is a flowchart showing a processing procedure of a traveling schedule estimation process according to a second embodiment.

FIG. 13 is a flowchart showing a processing procedure of the traveling schedule estimation process according to the second embodiment. When the traveling schedule estimation process starts, in 551, the ECU 200 sets information included within the deterioration time, among the schedule information, as the candidate information.

In 552, the ECU 200 determines a vehicle usage distance range from the user information. The vehicle usage distance range is a range of the traveling distance in which it is assumed that the user is likely to use the hybrid electric vehicle 1. For example, in the case where the user has a high probability of using the hybrid electric vehicle 1 when the traveling distance is 200 km or less and tends not to use the hybrid electric vehicle 1 when the traveling distance exceeds 200 km, the vehicle usage distance range is set to 0 km to 200 km.

The user information is, for example, the search history or the like in search software such as map software and transportation transfer guidance software installed in the user terminal 500. The ECU 200 estimates the users behavior pattern from these user information and determines the vehicle usage distance range.

For example, the ECU 200 acquires a plurality of histories in which the user has searched for a route of the vehicle in the map software in the past. The ECU 200 also acquires a plurality of histories in which the user has searched for a route of transportation (train or the like) in the transportation transfer guidance software in the past.

It is possible to estimate the range of distances in which the user is likely to use the hybrid electric vehicle 1 based on the distribution of the traveling distance of each of the histories of searching the route of the vehicle. Further, it is possible to estimate the range of distances in which the user is unlikely to use the hybrid electric vehicle 1 based on the distribution of the moving distance of each of the histories of searching the route of trains or the like. For example, when the former includes many traveling distances of 200 km or less, while the latter includes many moving distances exceeding 200 km, the vehicle usage distance range is set to 0 km to 200 km.

Since the vehicle usage distance range differs depending on the usage tendency of the hybrid electric vehicle 1 of the user, various patterns can be considered. Depending on the user, it is conceivable that the user uses the vehicle when the distance is short, that the user uses the vehicle when the distance is long, and that the user uses the vehicle in a specific distance range.

In S53, the ECU 200 sets the information including the location information, among the candidate information, as the traveling schedule. Similar to S23, for example, "B City in A Prefecture", "Hot Spring D", "G City in F Prefecture", "Amusement Park I", and the like are set as the traveling schedules.

In S54, the ECU 200 transmits the location information to the server device 400. In the above example, the ECU 200 transmits "B City in A Prefecture", "Trip to Hot Spring D", "G City in F Prefecture", "Amusement Park I", and the like and the user's location information as the location information.

When the process in the server device 400 starts, in S61, the server device 400 determines whether the location information has been received. When it is determined that the location information has been received (YES in S61), the server device 400 advances the process to S62. When it is not determined that the location information has been received (NO in S61), the server device 400 returns the process to the main routine.

In S62, the server device 400 calculates and transmits the traveling distance information, and returns the process to the main routine. In S55 of the traveling schedule estimation process, the ECU 200 acquires the traveling distance information from the server device 400. These processes are the same as those of S32 and S26.

In S56, the ECU 200 sets a traveling schedule having a traveling distance falling within the vehicle usage distance range and equal to or longer than the predetermined distance, among the traveling schedules, as a long-distance traveling schedule, and ends the traveling schedule estimation process.

It is assumed that the traveling distance of the traveling schedules "B City in A Prefecture", "Hot Spring D", and "Amusement Park I" are each equal to or longer than the predetermined distance (SD), and of the traveling schedules, the traveling distance of "Hot Spring D" does not fall within the vehicle usage distance range. In this case, the ECU 200 sets the traveling schedules "B City in A Prefecture" and "Amusement Park I" as the long-distance traveling schedules.

Third Embodiment

Hereinafter, a third embodiment will be described. In the description of the third embodiment, the differences from the first and second embodiments will be described, and description on the common parts will be omitted.

In the first and second embodiments, it is estimated whether the schedule is a traveling schedule based on the schedule information extracted from general schedule management software. However, whether the schedule is a traveling schedule can only be estimated based on the information set in the schedule management software. Accordingly, even if the schedule is not actually a traveling schedule, the schedule may be counted as a traveling schedule.

Therefore, in the third embodiment, the user installs a dedicated software on the user terminal 500, and the user sets whether the schedule is a traveling schedule in the dedicated software. Hereinafter, the description will be made with reference to FIGS. 14 and 15. FIG. 14 is a diagram illustrating an example of a private vehicle usage setting screen displayed on the user terminal 500 according to the third embodiment.

Schedule management as shown in FIG. 6 can be performed also with the dedicated software. In addition to this, private vehicle usage can be set in the dedicated software. It is possible to transition from the schedule management screen as shown in FIG. 6 to the private vehicle usage setting screen as shown in FIG. 14.

On the private vehicle usage setting screen, a list of dates and destinations is extracted from the user's schedule. In this example, "B City in A Prefecture" is displayed as a schedule for "September 30th", "Business trip to Company C" is displayed as a schedule for "October 4th", "Trip to Hot Spring D" is displayed as a schedule for "October 9th", "Lesson in classroom E" is displayed as a schedule for "October 15th", "G City in F Prefecture" is displayed as a schedule for "October 17th", "Hospital H" is displayed as a schedule for "October 26th", and "Amusement Park I" is displayed as a schedule for "October 30th".

On the left side of the destinations, the item "use of private vehicle" is displayed for setting whether to use the hybrid electric vehicle 1 in the schedule. When using the hybrid electric vehicle 1, the user applies a check mark in the "use of private vehicle" item for each schedule.

In this example, check marks are applied to the destinations "B City in A Prefecture", "Trip to Hot Spring D", "G City in F Prefecture", and "Amusement Park I", which means that the hybrid electric vehicle 1 is used for these schedules. On the other hand, check marks are not applied to the destinations "Business trip to Company C", "Lesson in classroom E", and "Hospital H", which means that the hybrid electric vehicle 1 is not used for these schedules.

When the user presses the "send" button, the schedule information is transmitted to the hybrid electric vehicle 1 together with the information on whether the schedule is a traveling schedule.

FIG. 15 is a flowchart showing a processing procedure of a process executed by the user terminal 500 according to the third embodiment. When the process in the user terminal 500 starts, in S71, the user terminal 500 determines whether the send button has been pressed. When it is determined that the send button has been pressed (YES in S71), the user terminal 500 advances the process to S72. When it is not determined that the send button has been pressed (NO in S71), the user terminal 500 returns the process to the main routine.

In S72, the user terminal 500 adds the data in which the check boxes for using the private vehicle are applied to the traveling schedule. In S73, the user terminal 500 transmits the user information and the traveling schedule as the schedule information to the hybrid electric vehicle 1, and returns the process to the main routine.

Meanwhile, in the hybrid electric vehicle 1, the processes similar to those in FIGS. 7 to 9 are executed. However, in this case, the traveling schedule has already been set in the user terminal 500. Therefore, the process of setting the traveling schedule is not executed in S22 to S24, and the traveling schedule that has been set in the user terminal 500 is used as the traveling schedule. Since the traveling schedule is not an estimation but definite information set by the user, the determination accuracy in the promotion control switching determination process can be further improved.

The embodiments disclosed herein should be considered to be exemplary and not restrictive in all respects. The scope of the present disclosure is shown by the scope of claims rather than the descriptions above, and is intended to include all modifications within the meaning and the scope equivalent to the scope of claims.

What is claimed is:

1. A hybrid electric vehicle comprising:
an engine;
a motor configured to generate driving force;
a power storage device configured to supply electric power to the motor;
a control device configured to control the motor and the engine;
an acquisition unit configured to acquire schedule information in which a schedule of a user who uses the hybrid electric vehicle is recorded; and
a non-contact power receiving device that is able to receive electric power from power supply equipment outside a vehicle and that is able to receive electric power in a non-contact manner, wherein
the schedule information includes a traveling schedule, the hybrid electric vehicle travelling in a predetermined period according to the traveling schedule,
the predetermined period is a period from when fuel of the engine is refueled to a deterioration time, wherein the deterioration time is the time when the quality of the fuel has deteriorated due to aged deterioration,
when a traveling distance in a long-distance traveling schedule is a first distance, the control device increases a usage ratio of the engine relative to usage of the motor in the predetermined period than when the traveling distance is a second distance that is longer than the first distance, the long-distance traveling schedule is a schedule included in the traveling schedule and in which the hybrid electric vehicle travels for a predetermined distance or longer, the control device is configured to
- set the hybrid electric vehicle to either a charge depleting mode or a charge sustaining mode,
- perform promotion control in the predetermined period when the traveling distance in the long-distance traveling schedule is the first distance as compared with when the traveling distance is the second distance, the promotion control being a control in which the usage ratio of the engine is increased and a ratio of controlling to the charge sustaining mode is increased relative to normal control,
- be rechargeable by the electric power received by the non-contact power receiving device, and
- restrict charging from the power supply equipment when the promotion control is performed; and
- in a case where the non-contact power receiving device receives electric power from the power supply equipment arranged on a traveling path while the hybrid electric vehicle is traveling, when the promotion control is being executed, the control device is configured to prohibit non-contact external charging in order to restrict an upper limit value of a state of charge (SOC) of the power storage device during the promotion control.

2. The hybrid electric vehicle according to claim 1, wherein when the schedule information includes information about a location, the control device is configured to acquire the traveling distance based on the information about the location.

3. The hybrid electric vehicle according to claim 2 wherein the control device is configured to determine whether a schedule corresponds to the traveling schedule based on a keyword included in the schedule information.

4. The hybrid electric vehicle according to claim 1, wherein when the schedule information includes information about a location, the control device is configured to acquire the traveling distance based on the information about the location and determine whether a schedule corresponds to the traveling schedule based on the traveling distance.

5. The hybrid electric vehicle according to claim 1, wherein the control device is configured to
- switch from the charge depleting mode to the charge sustaining mode when a state of charge of the power storage device drops to a predetermined threshold value,
- determine whether a remaining amount of fuel becomes equal to or less than a predetermined amount indicating a decrease in the fuel by the deterioration time based on the traveling distance in the charge sustaining mode in the long-distance traveling schedule, and
- perform the promotion control in which the predetermined threshold value is increased in the predetermined period when the control device determines that the remaining amount does not become equal to or less than the predetermined amount.

6. The hybrid electric vehicle according to claim 5, wherein:
the predetermined threshold value includes a first threshold value, a second threshold value larger than the first threshold value, and a third threshold value larger than the second threshold value; and
the control device is configured to
- use the first threshold value in the predetermined period when the promotion control is not performed, and
- use the second threshold value in a first period in the predetermined period and uses the third threshold value in a second period later than the first period in the predetermined period when the promotion control is performed.

7. The hybrid electric vehicle according to claim 5, wherein:
the predetermined threshold value includes a first threshold value, a second threshold value larger than the first threshold value, and a third threshold value larger than the second threshold value; and
the control device is configured to
- use the first threshold value in the predetermined period when the promotion control is not performed, and
- use the second threshold value when the remaining amount is a first amount and uses the third threshold value when the remaining amount is a second amount smaller than the first amount in a case where the promotion control is performed.

8. The hybrid electric vehicle according to claim 5, wherein the deterioration time is a year.

* * * * *